United States Patent
Mizrachi et al.

(10) Patent No.: US 7,032,073 B2
(45) Date of Patent: Apr. 18, 2006

(54) CACHE SYSTEM FOR NETWORK AND MULTI-TASKING APPLICATIONS

(76) Inventors: Shay Mizrachi, 5 Kislev Street, Hod-Hasharon 45219 (IL); Rafi Shalom, 101/7 Haroe Street, Ramat Gan 52401 (IL); Amit Oren, 19 Shoam Street, P.O. Box 4293, Caesarea (IL)

( * ) Notice: Subject to any disclaimer, the term of this patent is extended or adjusted under 35 U.S.C. 154(b) by 685 days.

(21) Appl. No.: 10/134,461

(22) Filed: Apr. 30, 2002

(65) Prior Publication Data

US 2003/0033486 A1 Feb. 13, 2003

Related U.S. Application Data

(60) Provisional application No. 60/302,466, filed on Jul. 2, 2001.

(51) Int. Cl.
*G06F 12/00* (2006.01)
*G06F 12/14* (2006.01)
*G06F 13/28* (2006.01)

(52) U.S. Cl. ............... 711/119; 711/136; 711/141; 711/145; 711/160; 711/125

(58) Field of Classification Search ............... 718/100, 718/101, 102, 104, 107; 711/133, 134, 136, 711/114, 117, 118, 119, 125, 141, 143, 145, 711/160; 709/223
See application file for complete search history.

(56) References Cited

U.S. PATENT DOCUMENTS 5,493,667 A * 2/1996 Huck et al. ............ 711/125
5,761,716 A  6/1998 Byrn et al.

(Continued)

OTHER PUBLICATIONS

Postel; RFC 793 of the US DARPA, entitled "Transmission Control Protocol: DARPA Internet Program Protocol Specification"; Information Sciences Institute; Univ. of So. California; Sep. 1981; pp. 1-70.

(Continued)

*Primary Examiner*—Majid Banankhah

(57) ABSTRACT

Cache apparatus, including first and second cache memories, coupled to receive and hold context information from an external memory with respect to tasks, each task activated by one or more activating events, so that the context information is available for access by a processor in performing the tasks. The cache apparatus further includes a mapper, which is coupled to receive a classification of the tasks as fast and slow tasks. The mapper is adapted, upon receipt of one of the activating events for one of the fast tasks to be performed by the processor, to cause the context information with respect thereto to be received in the first cache memory, and upon receipt of one of the activating events for one of the slow tasks to be performed by the processor, to cause the context information with respect thereto to be received in the second cache memory.

56 Claims, 6 Drawing Sheets

U.S. PATENT DOCUMENTS

| | | | | |
|---|---|---|---|---|
| 5,809,527 A | * | 9/1998 | Cooper et al. | 711/133 |
| 5,809,543 A | * | 9/1998 | Byers et al. | 711/162 |
| 5,963,963 A | * | 10/1999 | Schmuck et al. | 707/205 |
| 6,438,655 B1 | * | 8/2002 | Nicol et al. | 711/136 |
| 6,601,143 B1 | * | 7/2003 | Lamparter | 711/134 |
| 6,771,646 B1 | * | 8/2004 | Sarkissian et al. | 370/392 |

OTHER PUBLICATIONS

C.R. Baugh; "4IPP Traffic Model for IEEE 802.16.3"; Submitted to IEEE Broadband Wireless Access Working Group, Session #10 on Oct. 31, 2000; pp. 0-12.

Haykin; "Adaptive Filter Theory", a book, Published in 1986 by Prentice-Hall; pp. 4-10, 108-113.

* cited by examiner

CACHE SYSTEM FOR NETWORK AND MULTI-TASKING APPLICATIONS

CROSS-REFERENCE TO RELATED APPLICATIONS

This application claims the benefit of U.S. Provisional Patent Application No. 60/302,466, filed Jul. 2, 2001, which is assigned to the assignee of the present invention and which is incorporated herein by reference.

FIELD OF THE INVENTION

The present invention relates generally to methods and devices for cache management, and specifically to cache management for network and multi-tasking applications.

BACKGROUND OF THE INVENTION

Modern digital packet communication networks commonly employ a connection-oriented protocol such as the widely-used Transmission Control Protocol/Internet Protocol (TCP/IP) suite to assure reliable inter-process communication between pairs of processes in host computers. The TCP is described by Postel in RFC 793 of the U.S. Defense Advanced Research Projects Agency (DARPA), entitled "Transmission Control Protocol: DARPA Internet Program Protocol Specification" (1981), which is incorporated herein by reference. "Connection-oriented" signifies that a pair of processes wishing to exchange messages must execute a procedure to establish a connection between them (e.g., the three-way handshake defined for the TCP in RFC 793), and that any messages sent are associated with the connection. Thus, a connection is a unique logical link between two processes attached to a networks established by mutual consent, allowing an exchange of messages between the processes, and terminated by one of the two processes upon conclusion of the exchange. A single host computer can participate in a large number of connections, since a host can contain a plurality of processes, each of which may establish an independent connection.

A connection is characterized by a set of data termed a connection context, or a Transmission Control Block in RFC793 terms. The connection context comprises information such as the status of the connection, connection name, number of buffers awaiting acknowledgment, pointers to send and receive buffers, security data, and amount of time to allow before identifying a transmission timeout.

A process sending or receiving a packet requires access to the connection context in order to handle the packet correctly and efficiently. The process needs to retrieve information from the connection context, e.g., a pointer to a receive buffer, and must also modify the connection context, e.g., to increment the number of buffers awaiting acknowledgment. In order to minimize access time to connection context information, it would be desirable to store all connection contexts in a fast memory array, e.g., an on-chip memory. However, since the number of connections may be large, cost and size constraints generally preclude storing all connection contexts in such a fast memory.

A common strategy for balancing a need for fast access to frequently-used information with a need to access large amounts of information is caching. Caching makes use of a small fast memory cache to hold a portion of a total database, according to expectations about which data is likely to be accessed. When a process requests a data item, a caching mechanism first checks if the item already resides in the cache. If so, the data item is passed immediately to the requesting process. This situation is termed a "cache hit." If the data item does not already reside in the cache, a situation termed a "cache miss" occurs, and the data item must be fetched from a main memory (a relatively slow operation), stored in the cache, and passed to the requesting process.

The expectations regarding which data is likely to be accessed rely on two properties of the access patterns of most programs: temporal locality, meaning that if an item is accessed once, it is likely to be accessed again soon; and spatial locality, signifying that if one memory location is accessed, nearby memory locations are also likely to be accessed. To track temporal locality, many cache management schemes entail an aging of the items in the cache in order to determine which items were accessed recently. In addition, spatial locality dictates that, when data is loaded into a cache, additional adjacent memory locations beyond the specific item requested are also loaded, in an attempt to anticipate future requests. As noted, a cache can usually hold only a portion of the entire database. When the cache is full and a cache miss has occurred, the cache management mechanism must replace an existing item of the cache with new data. A method of selecting which item to replace is termed a "replacement algorithm." Least Recently Used (LRU) is one such replacement algorithm, based on temporal locality and calling for replacing items which were not accessed for the longest time. Another replacement algorithm known in the art calls for replacing a randomly-selected item in the cache.

Advances in network speed to multi-gigabit rates are driving developments to streamline and expedite all areas of network communications. Access to connection context information is one such area. Common cache replacement techniques, e.g., LRU and random replacement, while often suitable for the access patterns of a variety of general-purpose applications, do not necessarily provide adequate performance levels for network communications applications, particularly connection context caching.

Reference is now made to FIG. 1 which is a schematic block diagram illustrating a sample computer system using a Least Recently Used cache replacement algorithm on a connection context cache for four connections. Connections A, B, C, and D, also identified as 12, 14, 16, and 18 respectively, communicate with a network receiver 20, at the same rate but with a small phase shift. Arrivals of messages on connections A, B, C, and D constitute activating events for network receiver 20. A connection context cache 22 comprises a cache management mechanism, and can accommodate only two entries. FIG. 1 is a "snapshot" of connection C addressing receiver 20, and the effects on cache 22. Previous to the snapshot, receiver 20 received a first activating event (message arrival) from connection A (indicated by a dashed arrow 13 from Connection A to the receiver), causing a cache miss in a connection context cache 22. The cache management mechanism loaded a connection context A 26, from an external memory connection context database 24, thus making context A available to receiver 20. Shortly thereafter, connection B generated an activating event (indicated by a dashed arrow 15 from connection B to the receiver), resulting in another cache miss, and the loading of context B 28 from the external memory into the connection context cache (indicated by dashed arrows from contexts A and B in external memory 24, to contexts A and B in connection cache 22). Thus, the state of the connection context cache is as shown in FIG. 1, containing context data for connections A and B.

Connection C now generates a message to the receiver, an activating event indicated by a solid arrow 17 from connection C to the receiver. Since context C does not reside in the connection context cache, a cache miss occurs. The cache management mechanism must perform a "cache replacement," i.e., replace one of the contexts with connection context C. Based on LRU, context A is replaced by context C: context A is stored back in the external memory in order to preserve modifications that occurred to conext A (indicated by a solid arrow from the connection context cache/context A to the external memory) and context C is fetched into the cache (indicated by a solid arrow from the external memory/context C to the connection context cache). After these actions, the connection context cache contains contexts B and C. The next event to occur is the arrival of a message via connection A, again resulting in a cache miss. The oldest context in the cache is now context B, which is replaced by fetching context A from external memory.

Table I presents the cache replacement pattern for the LRU cache system depicted in FIG. 1 and described in the foregoing:

TABLE I

| Cycle | Message Arrival | Cache contents after arrival | Cache miss? |
|---|---|---|---|
| 1 | A | A | [initial load] |
| 2 | B | A B | [initial load] |
| 3 | C | B C | YES |
| 4 | A | A C | YES |
| 5 | B | A B | YES |
| 6 | C | B C | YES |

After initial loads in cycles 1 and 2, the cache miss rate is 100%. As is apparent from this simplified example, the connection context cache provides no performance benefit, since every access to a context results in a read operation from the slower external memory.

One attempt to address this shortcoming is disclosed in U.S. Pat. No. 5,761,716 to Byrn et al., whose disclosure is incorporated herein by reference. Byrn describes a method by which a cache entry is selected for replacement if it is a most recently used block among cache data blocks associated with a channel having a lowest data access rate. The cache replacement algorithm disclosed in the Byrn patent is termed "Lowest Rate, Most Recently Used." The data access rate is equivalent to either a rate of data transfer in a system comprising data communication channels, or a priority associated with a task, in a case of a system comprising a plurality of tasks. The data access rates of the tasks or channels are considered cyclic, i.e., expressed in terms of a data access every N time slices. In addition, the data access rates are considered invariant over the life of the process or communication. The lowest rate, most recently used replacement algorithm provides some performance improvements over LRU.

As Byrn et al. describe, taking into account task priority can improve cache replacement performance. By the same token, understanding characteristics of network traffic may provide a way of improving cache systems for network applications. C. R. Baugh proposed a model for network traffic behavior in a paper titled "4IPP Traffic Model for IEEE 802.16.3," submitted to the Institute for Electronic and Electrical Engineers (IEEE) Broadband Wireless Access Working Group, Session #10 on Oct. 31, 2000, which can be found at http://wirelessman.org/tg3/contrib/802163c-00_51. pdf, and which is incorporated herein by reference. Bauch suggests that a superposition of four Interrupted Poisson Processes (4IPP) has been proven to model self-similar traffic, i.e., network traffic in which there exists a high correlation between a present packet and a previous packet, such as is found in transmissions according to an Ethernet protocol and/or in the Internet. An IPP may be in one of two states: an ON state, when packets are generated; an OFF state, when packets are not generated. Further, an IPP is characterized by three parameters: transition probability rate $C1$, which is the number of transitions from the ON state to the OFF state per unit of time; transition probability rate $C2$, which is the number of transitions from the OFF state to the ON state per unit of time; and $\lambda$, the number of packets generated per unit of time when the process is in the ON state. Baugh states that "packet traffic is reasonably well modeled by using just 4 Interrupted Poisson Processes if the parameters of each Interrupted Poisson Process are appropriately chosen . . . . The 4IPP model superimposes 4 different time scales to generate an accurate representation of traffic for Ethernet and Internet."

SUMMARY OF THE INVENTION

It is an object of some aspects of the present invention to provide a method and apparatus for a network interface that streamlines access to connection information.

It is a further object of some aspects of the present invention to provide a method and apparatus for dynamically estimating communications rates for connections in a network.

It is a yet further object of some aspects of the present invention to provide a method and apparatus for using estimated communication rates in a cache replacement algorithm.

In preferred embodiments of the present invention, an architecture of internal and external connection context memories is defined. The architecture comprises an external memory, containing connection context information, termed a connection context database, for all established connections. An internal "priority" cache memory is coupled to the external memory, and comprises context information for connections defined as fast connections. An internal "utility" cache memory is coupled to the external memory, for use in processing slow connections. A mapper is coupled to the two internal memories and to one or more message processing engines in the network interface. The mapper administers the different memories. Finally, a rate estimator, coupled to the mapper, dynamically determines relative rates of active connections. The rates are used to classify the connections as fast or slow. The architecture thus defined comprises a cache system for network applications using rate estimation. Most preferably, the architecture, apart from the external memory, is implemented as a single chip or board which acts as the network interface.

One of the message processing engines in the network interface receives an activating event, i.e., a message from an established connection in a network. In order to process the message, the processing engine initiates a load command for the connection context information. The mapper determines if the connection is classified as fast or slow. Connection contexts for all fast connections are set to reside in the priority memory. Thus, the mapper can supply the context to the requesting processing engine without an additional load operation. If the connection is classified as slow and not already resident in the utility cache, the context is loaded from external memory to the utility cache memory, where it is used in processing the message.

A dynamic estimation of a rate of each connection is performed, which may modify the classification of a specific connection according to the changing nature of network traffic. The rate estimation comprises two stages: temporal rate measurement and adaptive filtering. In the temporal rate measurement stage, a new current connection rate is computed as a function of a number of events, i.e., messages, occurring within a time window Tsec, a previous rate, and a factor alpha, generated by the adaptive filtering stage. Alpha preferably has an initial value of 0.5. The adaptive filtering stage computes the factor alpha as a function of a previous value of alpha, the number of events occurring within successive time windows, and a count of the number of accesses to the external memory in the same windows.

Unlike other methods known in the art for network and multi-tasking application cache systems, in preferred embodiments of the present invention:

Two classes of internal memory are defined, for optimizing handling of slow and fast connections;

Dynamic rate estimation adjusts the classification of each connection responsive to an actual behavior of the connection, enabling management of context information according to changing network traffic;

Since fast connections generate more messages, using a partitioned cache architecture based on rate estimation minimizes slow external memory accesses by assuring that context information for faster connections resides in fast internal memory;

Applying temporal locality assures that a connection context will remain resident in the respective internal cache memory until processing of a given message has completed, avoiding unnecessary cache replacement operations;

The connection context memory architecture addresses the trade-offs between a large number of connections and a need to access connection context information efficiently, thus minimizing time expended on fetching and storing connection information and thereby accelerating handling of incoming messages; and Optimizations are realized for non-network multi-tasking systems, wherein activating events such as interrupts are generated by computational tasks or hardware devices, and context information refers to task contexts, including register states and task variable values.

There is therefore provided, according to a preferred embodiment of the present invention, cache apparatus, including:

first and second cache memories, coupled to receive and hold context information from an external memory with respect to a plurality of tasks, each task activated by one or more activating events, so that the context information is available for access by a processor in performing the tasks; and a mapper, which is coupled to receive a classification of the tasks as fast and slow tasks, and which is adapted, upon receipt of one of the activating events for one of the fast tasks to be performed by the processor, to cause the context information with respect thereto to be received in the first cache memory, and upon receipt of one of the activating events for one of the slow tasks to be performed by the processor, to cause the context information with respect thereto to be received in the second cache memory.

Preferably, the apparatus includes a rate estimator module, which is adapted to compute respective rates of the tasks performed by the processor, so that the tasks are classified as the fast and the slow tasks.

Preferably, the rate estimator module includes:

a rate estimator for each of the plurality of tasks, which is adapted to calculate a current-rate for a respective task, responsive to a previous-rate of the respective task, a first number of activating events received for the respective task, and a filter parameter; and an interface rate minimizer for the plurality of tasks, which is adapted to calculate the filter parameter, responsive to a second number of activating events received for the plurality of tasks and a number of accesses to the external memory.

Further preferably, the rate estimator includes:

an activating-event-counter for the respective task, which is adapted to count the first number of activating events received for the respective task during a time T of a rate-window; and a rate-calculator, which is adapted to set the current-rate substantially equal to $(1-\alpha)^*\text{LastRate}+\alpha^*\text{Nc}$, wherein $\alpha$ is the filter parameter, LastRate is the previous-rate, and Nc is the first number of activating events, for the respective task.

Preferably, the time T is determined in response to a model of expected behavior of the activating events.

Further preferably, the time T includes a value of the order of 1000 μs.

Preferably, the rate estimator includes a first logic resident in the first cache memory, and a second logic resident in at least one of the external memory and the second cache memory.

Preferably, the rate estimator operates periodically, responsive to an elapse of time.

Further preferably, the interface rate minimizer operates periodically, responsive to an elapse of time.

Preferably, the interface rate minimizer includes:

an external-memory-access-counter, which is adapted to count the number of accesses to the external memory during a time T1 of a sliding-window;

an activating-event-counter for the plurality of tasks, which is adapted to count the second number of activating events received for the plurality during time T1; and a filter-parameter-calculator, which is adapted to set a value $\alpha^{n+1}$ for the sliding-window to be substantially equal to $$\frac{\alpha^n}{\exp\left((f(\alpha)^n - f(\alpha)^{n-1})*\text{Lim}\left(\frac{1}{\log\left(\frac{\alpha^n}{\alpha^{n-1}}\right)}\right)\right)}$$

wherein n+1, n, and n−1 are sliding-window time indices, $f(\alpha)^n$ is an adaptive filter cost function at time index n, $f(\alpha)^{n-1}$ is an adaptive filter cost function at time index n−1, $\alpha^{n+1}$ is the value of the filter parameter at time index n+1, $\alpha^n$ is the value of the filter parameter at time index n, $\alpha^{n-1}$ is the value of the filter parameter at time index n−1, and Lim is a limiting function.

Preferably, the time T1 is determined to be substantially equal to a product of X and T, wherein T includes a time for which the current-rate is calculated, and X is a value in a range between approximately $10^3$ and approximately $10^6$.

Preferably, the limiting function includes a function $$\mathrm{Lim}(x) = \begin{cases} L & \text{for } x > L \\ x & \text{for } -L < x < -L \\ -L & \text{for } x < -L \end{cases}$$

wherein x is a real number and L is a limiting value.

Further preferably, the limiting value L is set to be substantially equal to 10.

Preferably, tie rate estimator module analyzes the activating events so as to generate a model of an expected behavior thereof.

Further preferably, the model includes a 4 Interrupted Poisson Process (4IPP) model of network traffic.

Preferably, the classification of the tasks is performed periodically, so as to provide for a reclassification of the tasks, responsive to changes in a rate of the receipt of the activating events over time.

Preferably, the tasks include processes in a network transceiver application having a plurality of connections, each connection having a connection context, and the one or more activating events includes one or more packets received and transmitted via the connections.

Preferably, the tasks include processes in a multi-tasking system, each task having a respective priority, the classification of the tasks being responsive to the priority and to a rate of the one or more activating events, and the one or more activating events are chosen from a group including reading of data from an input stream, an interrupt, and computation logic.

Further preferably, the first cache memory receives and holds substantially all the context information for the fast tasks and the second cache memory receives and holds the context information for the slow tasks.

Preferably, the processor includes a plurality of processing engines.

Preferably, causing the context information to be received in the first cache memory includes selecting a replacement-candidate context information, storing the replacement-candidate context information in the external memory, and loading the context information into the first cache memory.

Preferably, causing the context information to be received in the second cache memory includes selecting a replacement-candidate context information, storing the replacement-candidate context information in the external memory, and loading the context information into the second cache memory.

Preferably, the tasks receive the one or more activating events at a rate varying over time.

Preferably, the one or more activating events for a first task in the plurality are generated substantially independently of the one or more activating events for a second task in the plurality.

Preferably, the first and second cache memories and the mapper are implemented in an integrated circuit chip.

Preferably, at least one of the first and second cache memories includes an on-chip memory.

Further preferably, the mapper is adapted to generate a set of replacement-candidates from among the context information in the first and second cache memories, responsive to the classification of the tasks.

Preferably, the mapper is adapted to perform a synchronization between a handling of a first and a second activating event included in the one or more activating events for one of the tasks, the synchronization including:

causing the context information for the task to be received in the first and second cache memories upon receipt of the first activating event, the processor performing the task responsive to the first activating event for a time duration; and causing the context information for the task to be retained in the first and second cache memories upon receipt of the second activating event for the task within the time duration, so that the context information remains available to the processor in performing the task responsive to the second activating event.

Preferably a first processor included in the processor performs the task responsive to the first activating event, and a second processor included in the processor performs the task responsive to the second activating event, the first and second processors accessing the context information received in the cache memories upon receipt of the first activating event.

There is further provided, according to a preferred embodiment of the present invention, a method for managing a cache memory, including:

determining classifications of a plurality of tasks to be performed by a processor, the tasks having respective context information residing in an external memory, each task being activated by one or more activating events, according to rates of the tasks;

partitioning the cache memory so as to allocate respective areas of the cache memory to the tasks according to the classifications; and upon receipt of the one or more activating events for one of the tasks to be performed by the processor, conveying the context information with respect thereto from the external memory to the respective areas of the cache memory, responsive to the classification, for use by the processor in performing the tasks.

Preferably, determining the classifications includes computing the rates of the tasks so that the tasks are classified as fast and slow tasks, and partitioning the cache memory includes partitioning the cache memory into first and second areas of the cache memory.

Preferably, computing the rates of the tasks includes:

calculating a current-rate for a respective task, responsive to a previous-rate of the respective task, a first number of activating events received for the respective task, and a filter parameter; and computing the filter parameter, responsive to a second number of activating events received for the plurality of tasks and a number of accesses to the external memory.

Further preferably, calculating the current-rate includes:

counting a number of activating events received for the respective task during a time T of a rate-window; and setting the current-rate substantially equal to $(1-\alpha)*\text{LastRate}+\alpha*Nc$, wherein $\alpha$ is the filter parameter, LastRate is the previous-rate, and Nc is the number of activating events, for the respective task.

Preferably, the time T is determined in response to a model of expected behavior of the activating events.

Preferably, the time T is substantially equal to a value of the order of 1000 μs.

Further preferably, calculating the current-rate for the task classified as the fast task includes executing a first logic resident in the first cache memory, and calculating the current-rate for the task classified as the slow task includes executing a second logic resident in at least one of the external memory and the second cache memory.

Preferably, calculating the current-rate is performed periodically, responsive to an elapse of time.

Further preferably, computing the filter parameter is performed periodically, responsive to an elapse of time.

Preferably, computing the filter parameter includes:

counting the number of accesses to the external memory during a time T1 of a sliding-window;

counting the second number of activating events received for the plurality of tasks during the time T1; and setting the filter parameter for the sliding-window for a time n+1 to be substantially equal to $$\frac{\alpha^n}{\exp\left((f(\alpha)^n - f(\alpha)^{n-1}) * \mathrm{Lim}\left(\frac{1}{\log\left(\frac{\alpha^n}{\alpha^{n-1}}\right)}\right)\right)}$$

wherein n+1, n, and n−1 are sliding-window time indices, $f(\alpha)^n$ is an adaptive filter cost function at time index n, $f(\alpha)^{n-1}$ is an adaptive filter cost function at time index n−1, $\alpha^{n+1}$ is the value of the filter parameter at time index n+1, an is the value of the filter parameter at time index n, $\alpha^{n-1}$ is the value of the filter parameter at time index n−1, and Lim is a limiting function.

Preferably, the time T1 is determined to be substantially equal to a product of X and T, wherein T includes a time for which the current-rate is calculated, and X includes a value in a range between approximately $10^3$ and approximately $10^6$.

Preferably, the limiting function includes a function $$\mathrm{Lim}(x) = \begin{cases} L & \text{for } x > L \\ x & \text{for } -L < x < -L \\ -L & \text{for } x < -L \end{cases}$$

wherein x is a real number and L is a limiting value.

Further preferably, the limiting value L is set to be substantially equal to 10.

Preferably, computing the rates of the tasks includes analyzing the activating events, so as to generate a model of an expected behavior thereof.

Preferably, the model comprises a 4 Interrupted Poisson Process (4IPP) model of network traffic.

Preferably, determining the classifications is performed periodically, so as to provide for a reclassification of the tasks, responsive to changes in a rate of the receipt of the one or more activating events over time.

Preferably, the tasks include processes in a network transceiver application having a plurality of connections, each connection having a connection context, and the one or more activating events includes one or more packets received and sent via the connections.

Further preferably, the tasks include processes in a multi-tasking system, each task having a respective priority, the classification of the tasks being responsive to the priority and to a rate of the one or more activating events, and the one or more activating events are chosen from a group consisting of reading of data from an input stream, an interrupt, and computation logic.

Preferably, partitioning the cache memory includes allocating a first cache area and a second cache area, and determining the classifications includes classifying a first task included in the tasks as a fast task and a second task included in the tasks as a slow task.

Preferably, conveying the context information includes conveying the context information for the fast task to the first cache area and conveying the context information for the slow task to the second cache area.

Preferably, conveying the context information with respect to the fast task includes selecting a replacement-candidate context information, storing the replacement-candidate context information in the external memory, and loading the context information with respect to the fast task into the first cache area.

Further preferably, conveying the context information with respect to the slow task includes selecting a replacement-candidate context information, storing the replacement-candidate context information in the external memory, and loading the context information with respect to the slow task into a second cache area.

Preferably, the processor includes a plurality of processing engines.

Preferably, the tasks receive the one or more activating events at a rate varying over time.

Further preferably, the one or more activating events for a first task in the plurality of tasks are generated substantially independently of the one or more activating events for a second task in the plurality of tasks.

Preferably, the method includes implementing determining classifications, partitioning the cache memory, and conveying the context information in a logic in an integrated circuit chip.

Preferably, at least one of cache memory areas includes an on-chip memory store.

Preferably, conveying the context information includes generating a set of replacement-candidates from among the context information in a first and second area of the cache memory included in the respective areas, responsive to the classifications of the tasks.

Preferably, the method includes performing a synchronization between a handling of a first and a second activating event included in the one or more activating events for one of the tasks, the synchronization including:

conveying the context information for the task to an area in the cache memory, upon receipt of the first activating event, the processor performing the task responsive to the first activating event for a time duration; and causing the context information to be retained in the area of the cache memory upon receipt of the second activating event for the task within the time duration, so that the context information remains available to the processor in performing the task responsive to the second activating event.

Preferably, a first processor performs the task responsive to the first activating event, and a second processor performs the task responsive to the second activating event, the first and second processors accessing the context information received in the cache memory upon receipt of the first activating event.

The present invention will be more fully understood from the following detailed description of the preferred embodiments thereof, taken together with the drawings, in which:

DETAILED DESCRIPTION OF PREFERRED EMBODIMENTS

Figure 1:
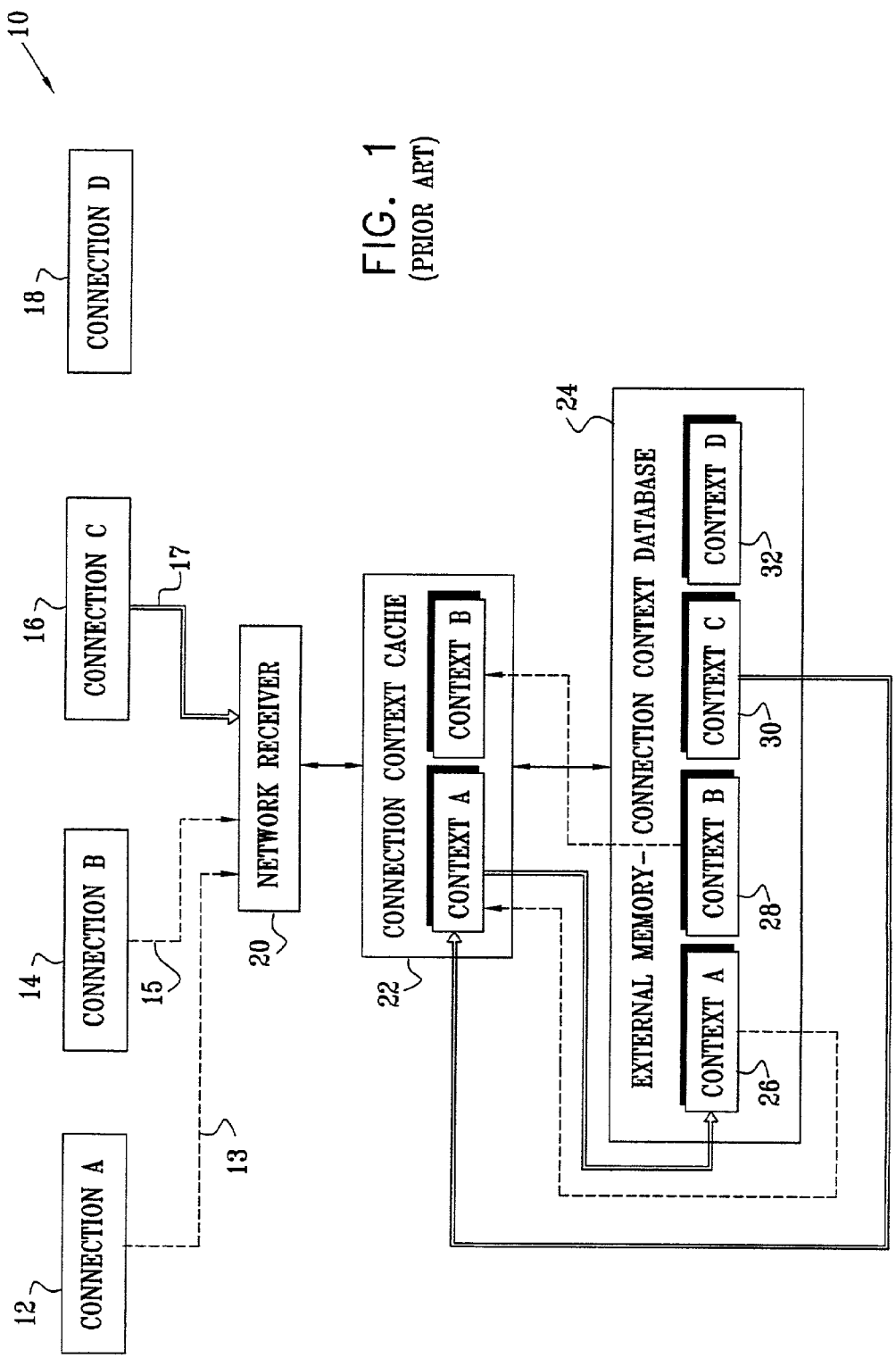
FIG. 1 is a schematic block diagram illustrating a sample computer system using a Least Recently Used cache replacement algorithm on a connection context cache for four connections, as is known in the art.
Figure 2:
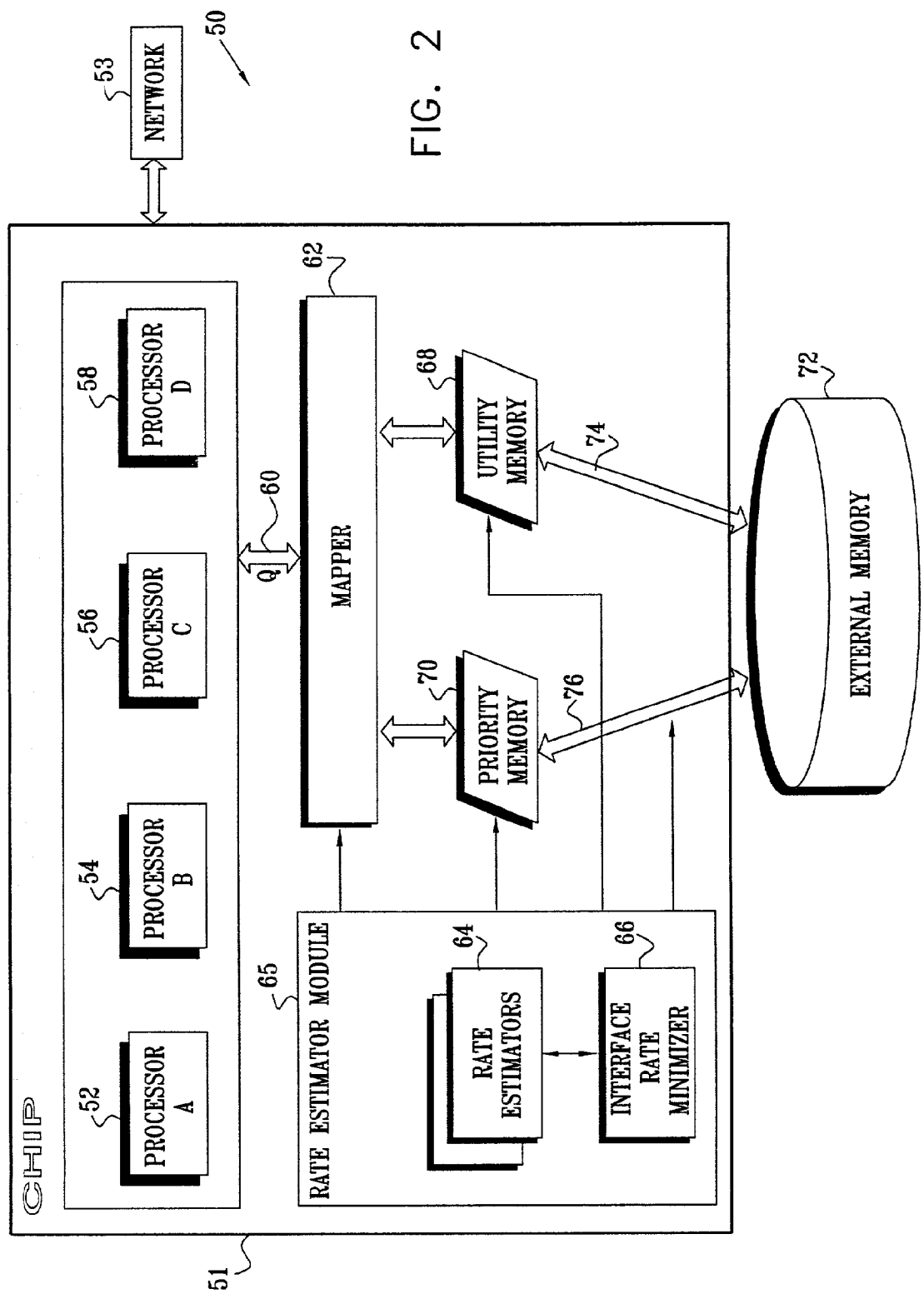
FIG. 2 is a schematic block diagram depicting an architecture of modules in a cache system for network applications, according to a preferred embodiment of the present invention.

Reference is now made to FIG. 2, which is a schematic block diagram depicting an architecture of modules in a cache system 50 for network applications, according to a preferred embodiment of the present invention. A chip 51 is coupled to a network 53, so as to transmit and receive packets on a plurality of connections via the network. Chip 51 implements network receiver 20 and connection context cache 22 (FIG. 1) and acts as a network interface. Chip 51 comprises processors A, B, C, and D, denoted 52, 54, 56, and 58 respectively, which are preferably coupled together in a pipeline so as to perform required processing responsive to activating events, i.e., packets transmitted or received. Network 53 generates these activating events, which are substantially the same as activating events 13, 15, and 17 emanating from connections A, B, and C respectively in FIG. 1.

A portion of the required processing involves reading and updating information about each of the plurality of connections, e.g., connection state, number of buffers awaiting acknowledgement, and security information. This information about a connection is termed "connection context," and a collection of connection contexts for all active connections is termed a "connection context database." The connection context database resides in an external memory 72, substantially equivalent to external memory 24 (FIG. 1). The database is preferably coupled to an on-chip priority memory 70 and an on-chip utility memory 68 on chip 51 by interfaces 76 and 74 respectively, to achieve maximum performance benefits. Priority memory 70 and utility memory 68 may be implemented using any type of cache addressing scheme known in the art, e.g., fully associative or set associative, and are preferably industry-standard Static Random Access Memory (SRAM) components. Alternatively, the priority and utility memories are implemented as off-chip, secondary cache memories. Priority memory 70 comprises connection context information for all fast connections; utility memory 68 comprises connection contexts for slow connections including a slow connection with a packet currently being processed. Dynamic classification of connections as slow or fast is described in detail below.

A mapper 62 is coupled to processors A, B, C, and D via an interface 60 to handle a request Q from one or more of the processors to access connection contexts. Mapper 62 is also coupled to the two on-chip memories, priority memory 70 and utility memory 68. The mapper receives request Q to access a connection context and determines if the respective connection is currently classified as slow or fast. Contexts for all fast connections are by definition stored in priority memory 70, so that the mapper can satisfy requests for fast connection contexts immediately, without accessing external memory 72. If request Q refers to a slow connection, whose context is not already resident in utility memory 68, the mapper initiates a load operation which retrieves the respective connection context from external memory 72. If the utility memory is full, the load operation also includes removing a resident context from the utility memory, and writing the resident context back to external memory, to preserve any modifications. Access to external memory 72 is slow, resulting in a delay in satisfying request Q and ultimately decreasing the throughput of packets received and transmitted by chip 51.

Thus, it is important to minimize the number of accesses to external memory 72. To this end, chip 51 comprises a rate estimator module 65, comprising one or more rate estimators 64 and an interface rate minimizer 66. Rate estimators 64 comprise a rate estimator function for each active connection. Interface rate minimizer 66 minimizes access to external memory by monitoring the number of such accesses and setting a filter parameter $\alpha$, which determines a cache mechanism switch rate. Together these components analyze behavior of active connections and connection context accesses, in order to classify connections dynamically as slow or fast, and to replace connection contexts in priority memory according to the dynamic classification. Logic and computations performed by the rate estimators and the interface rate minimizer are described in detail hereinbelow.

The various blocks that make up architecture 50 may be implemented as hardware circuits or as software processes running on a programmable processor, or as a combination of hardware- and software-implemented elements. Although certain functional elements of architecture 50 are shown as separate blocks in the figure for the sake of conceptual clarity, the functions represented by some or all of these blocks may actually be carried out by different software processes on one or more embedded processors. Further, alternative configurations of on-chip and off-chip memory are possible, as long as a distinction between fast and slow connections is preserved, as will be apparent to those skilled in the art. Preferably, all of the elements of chip 51 are implemented in a single integrated circuit chip, such as an application specific integrated circuit (ASIC), comprising a plurality of processing engines and storage components, employing industry-standard devices, or as a combination of standard and custom devices, but multi-chip implementations are also within the scope of the present invention.

Figure 3:
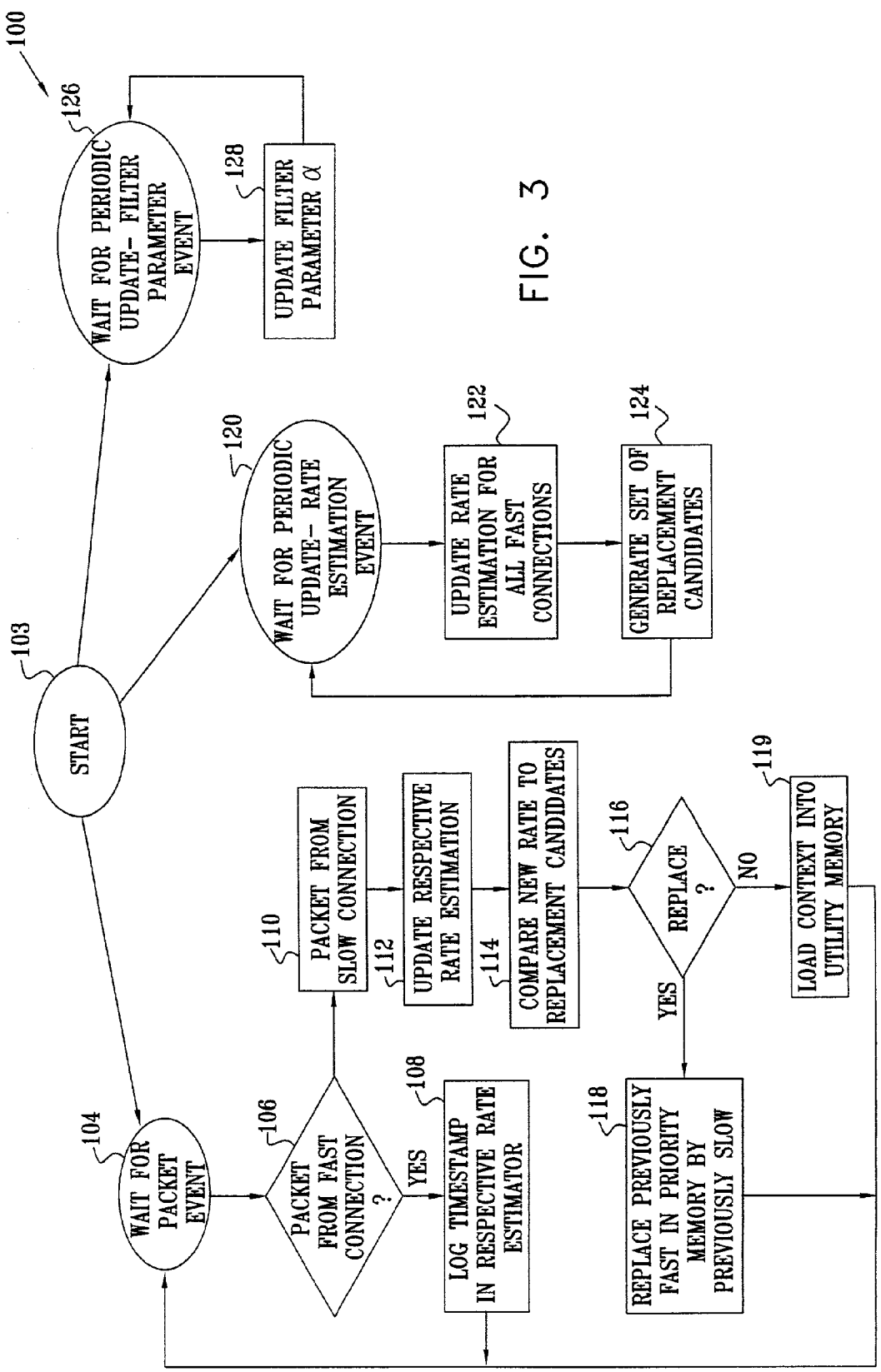
FIG. 3 is a flow chart showing operations performed by rate estimators and an interface rate minimizer comprised in the architecture of FIG. 2, according to a preferred embodiment of the present invention.

Reference is now made to FIG. 3, which is a flow chart showing operations 100 performed by rate estimators 64 and interface rate minimizer 66 (FIG. 2), according to a preferred embodiment of the present invention. Operations 100 begin with an initial start step 103, which divides into a wait-for-packet-event step 104 which waits for an activating event related to rate estimation, i.e., arrival of a packet; a wait-for-periodic-update-rate-estimation-event step 120, which waits for an occurrence of a time for a periodic update of a rate estimation; and a wait-for-periodic-update-filter-parameter-event step 126, which waits for an occurrence of a time for a periodic update of a filter parameter. Packet events and periodic update events are substantially independent, therefore operations resulting from each type of event follow separate, independent paths, as described herein. A condition 106 is a first step in a first path handling packet events, and checks if a packet arrived on a connection which is currently considered by mapper 62 as a fast connection. If so, a packet arrival time is logged in the respective rate estimator in priority memory 70 (FIG. 2), and further activating events are awaited in wait-for-packet-event step 104.

If condition 106 determines that the packet is not from a currently classified fast connection, the packet is then handled in a packet-from-slow-connection step 110, since connections are necessarily classified as either fast or slow. In a case of a packet arrival on a classified slow connection, an update-rate-estimation step 112 computes a new rate for the connection, as described in detail below. In a compare-new-rate step 114, the resulting new rate is compared to the rates of the connections in a set of replacement candidates, generated in a step 124 described below. A condition 116 determines if the new rate is faster than any of the respective rates of the replacement candidates. If so, the slow connection is termed "previously-slow," and replacement candidates having slower rates are termed "previously-fast." A replacement step 118 removes a previously-fast connection context from priority memory 70, and, if necessary, stores it back into the connection context database residing in external memory 72 (FIG. 2). Storing the previously-fast connection context is necessary when the connection context was modified in the priority memory, but the modifications are not yet reflected in external memory. Further, replacement step 118 loads the previously-slow connection context from external memory to priority memory. Such a store and load sequence is termed a cache replacement and is described with reference to FIG. 1 above. If condition 116 determines that the new rate is not faster than any of the respective rates of the replacement candidates, a load-utility-memory step 119 causes the context information for the slow connection to be loaded into utility memory 68.

In a second independent path, periodic update of rate estimation events are awaited in step 120, which detects if it is time to perform a periodic update of fast-connection rate estimations. If so, an update-rate-estimation-for-all-fast-connections step 122 is performed, which calculates a new rate for each connection resident in priority memory 70, i.e., each fast connection. A method for calculating the new rate is described in detail below, with reference to FIG. 4. The updated rate estimations produced by update-rate-estimation-for-all-fast-connections step 122 are used to identify a set of relatively slow connections from among the fast connections, termed "replacement candidates," in generate-replacement-candidates step 124.

In a third independent path, periodic update of filter parameter events are awaited in step 126, which detects that a time period has elapsed between periodic updates of filter parameter α (set in interface rate minimizer 66). In such a case, an update-filter-parameter step 128 is performed. The update-filter-parameter step involves applying an adaptive filtering algorithm to measurements of total packet arrivals and accesses to external memory. Computations performed to update α are described in detail below.

Figure 4:
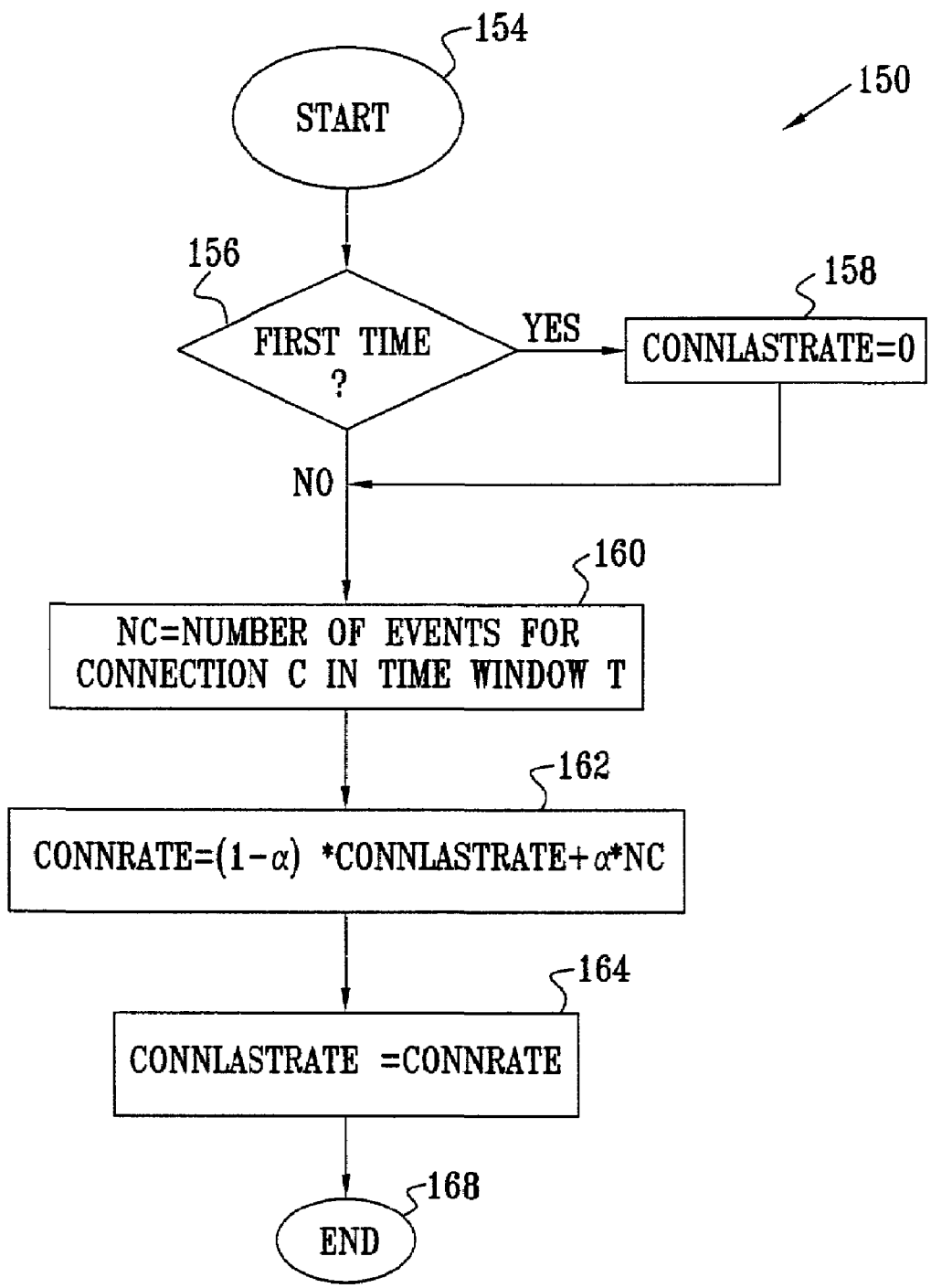
FIG. 4 is a flow chart depicting logic comprised in rate estimation updates comprised in the operations of FIG. 3 for a connection, according to a preferred embodiment of the present invention.

Reference is now made to FIG. 4, which is a flow chart depicting logic 150 comprised in rate estimation updates 112 and 122 (FIG. 3) for a connection C, according to a preferred embodiment of the present invention. Rate estimation logic 150 is performed separately for each connection, and uses a general parameter a, generated by an adaptive filter described in detail below. The rate estimation logic is invoked when the rate of a connection must be updated, i.e., the connection is classified as slow and a packet has arrived, as in step 110 (FIG. 3); or the connection is classified as fast and the time period for periodic update of rate estimation has elapsed, as in step 120 (FIG. 3). Rate estimation logic begins with an initial start step 154. Initialization steps 156 and 158 set a variable ConnLastRate to zero, in a case of a first execution o the logic. The rate estimation logic continues in a count-events step 160, wherein a number of packets which arrived on connection C during a time T of a rate window is saved in a variable NC. A compute-rate step 162 generates a current rate for connection C, using an equation (3) (described in detail below) comprising α and a previous rate, stored in ConnLastRate. A storage step 164 saves the current rate in ConnLastRate, as preparation for a next execution of the rate estimation logic.

The size of rate window T is a function of a model for network traffic (described in detail below). Using smaller rate windows result in noisier results, while larger windows may excessively smooth results. Examination of simulation results determines that a value of T of the order of 1000 μs is satisfactory.

Figure 5:
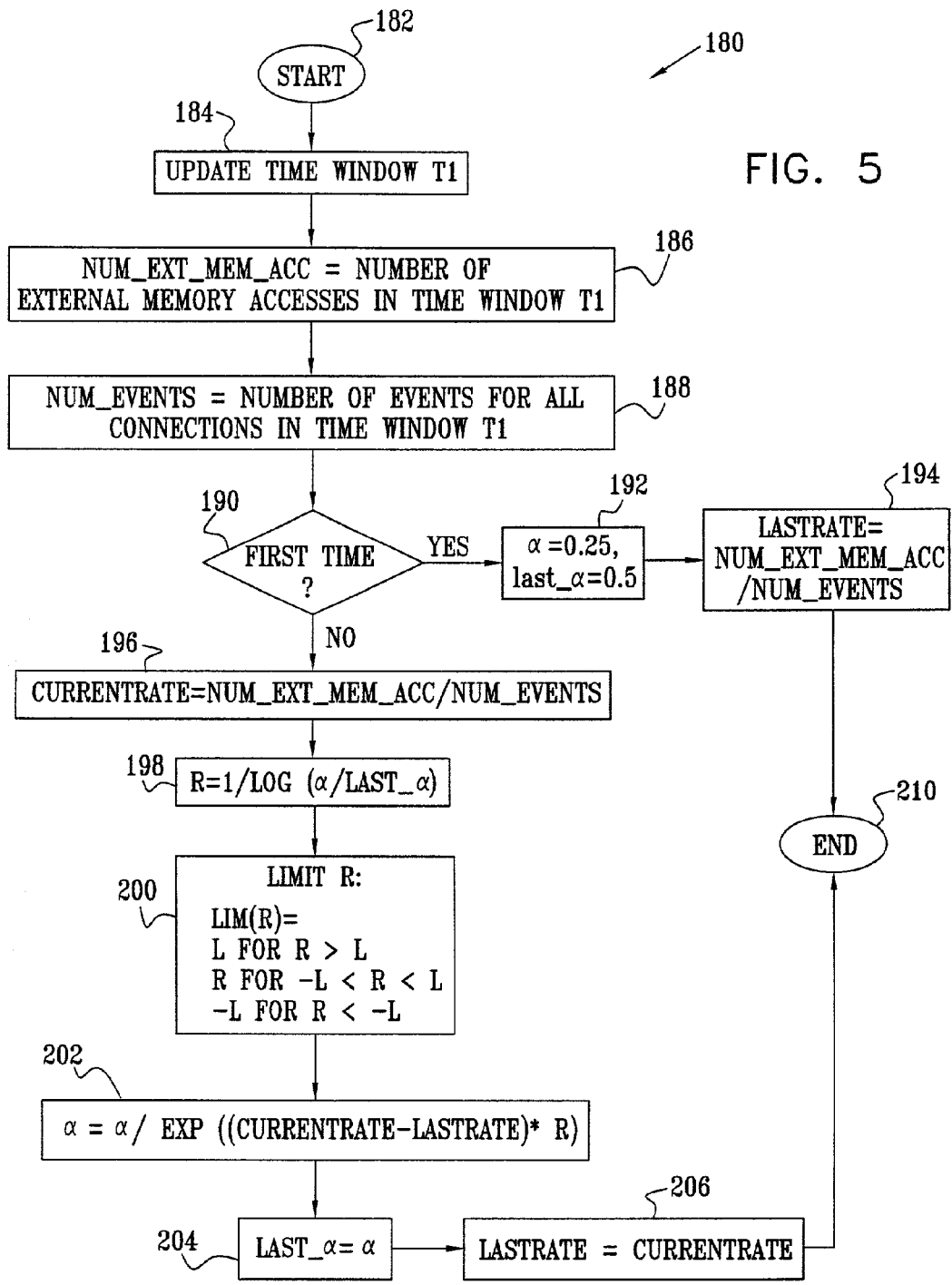
FIG. 5 is a flow chart illustrating logic comprised in generating a rate estimation parameter used in a rate calculation step of the logic of FIG. 4, according to a preferred embodiment of the present invention.

Reference is now made to FIG. 5, which is a flow chart illustrating logic comprised in generating rate estimation parameter α in update-filter-parameter step 128 (FIG. 3), and used in rate calculation step 162 (FIG. 4), according to a preferred embodiment of the present invention. Parameter α has a value between 0 and 1 and influences the frequency of cache replacements: lower values of α will result in a low-bandwidth, low-pass filter, and a slower rate of cache replacements; α values approaching 1 will yield a substantially all-pass filter, and a faster cache replacement rate. It is desirable to adapt α dynamically, to achieve a minimization of external memory accesses. A derivation of equations comprised in a calculation of α is presented in detail below.

An adaptive filter logic 180 begins in an initial step 182. In an update-window step 184, a sliding time window of length T1 is modified to reflect a passage of time since a previous execution of the logic. T1 is set according to equation (1).

$$T1 = X^* \tag{1}$$

where T is the time for the rate window, and

X is a value preferably in an approximate range between $10^3$ and $10^6$, so that T1 measures the influence of alpha.

In a count-external-memory-accesses step 186, the number of times external memory 72 (FIG. 2) was accessed during T1 is stored in NUM_EXT_MEM_ACC. In a count-events step 188, the number of packets arriving for all connections during T1 is stored in NUM_EVENTS. A first-time-condition 190 determines that initializations 192 and 194 must be performed, in a case of a first execution of adaptive filter logic 180. Initialization 192 preferably sets variables α and last_α to initial values 0.25 and 0.5, respectively, determined by simulation experience. Initialization 194 sets a variable LastRate equal to the quotient NUM_EXT_MEM_ACC divided by NUM_EVENTS. The first execution of adaptive filter logic 180 then terminates in an end step 210.

A subsequent execution of adaptive filter logic 180 is triggered by a lapse of the time period for periodic update of filter parameter α, i.e., when the event in step 126 (FIG. 3) occurs. In update-window step 184, T1 is modified to reflect the time since the previous execution of logic 180. As above, count-external-memory-accesses step 186 stores the number of times external memory was accessed during T1 in NUM_EXT_MEM_ACC and count-events step 188 stores the number of packets arriving for all connections during the sliding time window in NUM_EVENTS. After the first execution of the adaptive filter logic, first-time-condition 190 will be false, causing execution to continue at a compute CurrentRate step 196. A new value of a variable CurrentRate is calculated in step 196, by dividing NUM_EXT_MEM_ACC by NUM_EVENTS. A parameter R is then computed in a compute step 198, according to equation (2):

$$R = \frac{1}{\log\left(\frac{\alpha}{\text{last}\_\alpha}\right)}. \tag{2}$$

Term R is described in more detail below. A limiting step 200 limits R to a range between −L and L, where simulation experience has determined that L is preferably approximately 10. An update step 202 completes a calculation of a new value of α, according to equation (11) below. Storage steps 204 and 206 save a prior value of α and CurrentRate, in last_α a and LastRate, respectively, before terminating execution of the iteration of the adaptive filter logic in end step 210. A model of network traffic behavior proposed by C. R. Baugh and described in detail in the Background of the Invention above serves as a basis for rate estimation computations. In a preferred embodiment of the present invention, actual measurements of network traffic were used in simulations to determine the values of C1, C2, and λ for connections, each one modeled by 4 Interrupted Poisson Processes (4IPP), as suggested by Baugh. The simulations demonstrate that the four IPPs have approximately the same λ, but different C1 and C2 parameters. Thus, Baugh's model may be simplified to calculate a "temporal rate," i.e., a rate reflecting packet traffic for a specified time window, determined by multiplying λ by the number of Interrupted Poisson Processes currently in the ON state. By tracking the dynamic of the IPP states in this way, an overall rate for the connection may be estimated. Rate estimators 64 and interface rate minimizer 66 (FIG. 2) therefore comprise two steps, as illustrated in FIG. 4, steps 160 and 162, respectively: a temporal rate measurement step, which counts a number of packets for a given connection in T; and an adaptive filter step which evaluates the number of packets and external memory accesses for all connections over successive sliding times T1.

The adaptive filter step is described by the following equation:

$$y(n+1)=(1-\alpha)*y(n)+\alpha*x(n) \tag{3}$$

where n is the time step,
x(n) is the input signal,
y(n) is an output signal, and
α is the filter parameter, and where $0 \leq \alpha \leq 1$.

Equation (3) presents a low-pass filter with one pole at (1−α). Such filters are well known in the art, and are discussed, for example, in a book, *Adaptive Filter Theory*, by Haykin, published in 1986 by Prentice-Hall.

As stated above, parameter α influences the cache mechanism replacement rate. Lower values of α will cause a slower replacement rate, while values of α closer to 1 will result in a faster replacement rate. While a slower replacement rate, i.e., fewer accesses to external memory, is desirable, too low a value of α results in a failure to take advantage of the statistical properties of connection traffic. Simulations performed by the inventor demonstrate that excessively small (less than about $10^{-3}$) and excessively large (greater than about 1) values of α cause an overall increase in external memory relative access rates.

Figure 6:
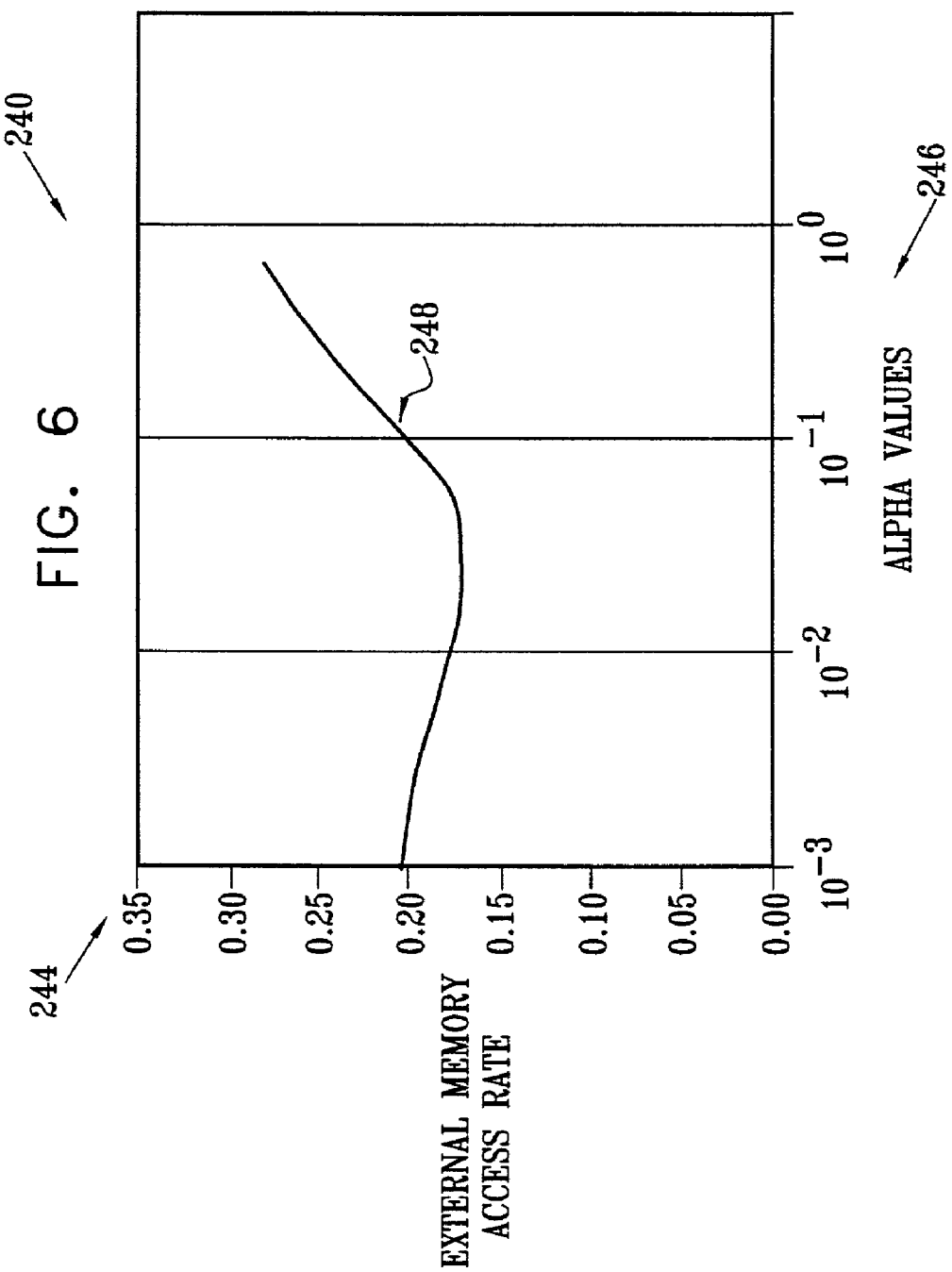
FIG. 6 is a graph produced by a simulation and depicting a typical relation between an external memory access rate and different values of the rate estimation parameter, according to a preferred embodiment of the present invention.

Reference is now made to FIG. 6, which is a graph produced by a simulation and depicting a typical relation between an external memory access rate and different values of α, according to a preferred embodiment of the present invention. Graph 240 has a y-axis 244 showing rates of external memory access in relative units, and an x-axis 246 showing values of α from $10^{-3}$ to 1. A curve 248 depicts a typical result of a simulation, i.e., calculation of the external memory access rate using actual data for varying values of α, from among a plurality of such simulations executed by the inventor.

Analysis of graphs, such as graph 240, generated from the simulations reveals that, when considered on a logarithmic scale, there is an optimal value of α which defines a minimum value of external memory access rate. One method for minimizing functions such as displayed by graph 240 is known in the art as Steepest Descent (SD), which is described in detail *Adaptive Filter Theory*, referred to hereinabove. SD is an iterative algorithm that performs line searches for a minimum first derivative along segments of a curve. The direction of the search along the curve is determined according to the point at which the gradient decreases most rapidly from an initial point.

Adaptive filtering algorithms typically seek to minimize a "cost function" $f(\alpha)$, i.e., a function expressing the difference between the filter output and the desired output. In the case of the adaptive filter to update α, it is desirable to minimize the cost function $f(\alpha)$, where $0 \leq \alpha \leq 1$, in order to achieve a minimization of the external memory access rate. Derivation of the adaptive filter function makes use of the following definition:

$$\alpha = \exp(A) \Rightarrow A = \log(\alpha) \tag{4}$$

According to the SD algorithm, the α adaptation equation is $$\alpha^{n+1} = \alpha^n - \frac{\partial f(\alpha)^n}{\partial \alpha} \tag{5}$$

where n is a time index.

Since $f(\alpha)$ appears convex on a logarithmic scale, it is desirable to operate on A instead of α. Restating equation (5) in terms of A gives equation (6):

$$A^{n+1} = A^n - \frac{\partial f(A)^n}{\partial A} \tag{6}$$

Applying definition (4) from above on equation (6) yields equation (7):

$$(\log(\alpha))^{n+1} = (\log(\alpha))^n - \frac{\partial f(\alpha)^n}{\partial(\log(\alpha))} \tag{7}$$

The derivative $$\frac{\partial f(\alpha)^n}{\partial(\log(\alpha))}$$

may be calculated using two last measured results of $f(\alpha)$. Thus, equation (7) may be transformed:

$$(\log(\alpha))^{n+1} = (\log(\alpha))^n - \frac{f(\alpha)^n - f(\alpha)^{n-1}}{\log(\alpha^n) - \log(\alpha^{n-1})} \quad (8)$$

And further:

$$\alpha^{n+1} = \exp\left(\log(\alpha^n) - \frac{f(\alpha)^n - f(\alpha)^{n-1}}{\log\left(\frac{\alpha^n}{\alpha^{n-1}}\right)}\right) \quad (9)$$

$$= \frac{\alpha^n}{\exp\left((f(\alpha)^n - f(\alpha)^{n-1}) * \frac{1}{\log\left(\frac{\alpha^n}{\alpha^{n-1}}\right)}\right)}$$

In order to ensure relative stability of $\alpha$ values, i.e., to prevent extreme fluctuations, it is necessary to limit the expression $$\frac{1}{\log\left(\frac{\alpha^n}{\alpha^{n-1}}\right)},$$

herein termed R. A limiting function for R is defined in equation (10):

$$\text{Lim}(x) = \begin{cases} L & \text{for } x > L \\ x & \text{for } -L < x < -L \\ -L & \text{for } x < -L \end{cases} \quad (10)$$

Experimentation shows that a limitation value of L being set to be approximately 10 yields satisfactory results, so that R can vary between approximately 10 and approximately −10.

Combining the foregoing, the update equation for the adaptive filter parameter $\alpha$, according to a preferred embodiment of the present invention is presented in the following equation (11):

$$\alpha^{n+1} = \frac{\alpha^n}{\exp\left((f(\alpha)^n - f(\alpha)^{n-1}) * \text{Lim}\left(\frac{1}{\log\left(\frac{\alpha^n}{\alpha^{n-1}}\right)}\right)\right)} \quad (11)$$

Equation (11) is implemented in logic comprised in interface rate minimizer 66 (FIG. 2). Flowchart 180 (FIG. 5), described in detail above, presents the logic comprising equations (10) and (11).

Reference is now made to Tables II and III hereinbelow, which present cache replacement patterns for an LRU algorithm and a rate estimation algorithm, respectively. Both algorithms are assumed to operate in identical environments, having the following characteristics: a total of five active connections, of which connections A, B, and C generate packets faster than connections D and E; and an available internal cache size of four entries.

Table II presents a cache replacement pattern resulting from using an LRU algorithm:

TABLE II

| Seq. | Packet Arrival | Cache contents after arrival | Cache miss? |
|------|----------------|------------------------------|-------------|
| 1    | A              | A                            |             |
| 2    | B              | A B                          |             |
| 3    | C              | A B C                        |             |
| 4    | A              | A B C                        |             |
| 5    | B              | A B C                        |             |
| 6    | C              | A B C                        |             |
| 7    | D              | A B C D                      |             |
| 8    | E              | E B C D                      | YES         |
| 9    | A              | E A C D                      | YES         |
| 10   | B              | E A B D                      | YES         |
| 11   | C              | E A B C                      | YES         |
| 12   | E              | E A B C                      |             |
| 13   | D              | E D B C                      | YES         |
| 14   | A              | E D A C                      | YES         |
| 15   | B              | E D A B                      | YES         |
| 16   | C              | C D A B                      | YES         |

The system presented in Table II comprises a four-entry internal cache, managed using an LRU algorithm. Packet arriving in seq. 1–3 and 7 cause an initial loading of connection contexts into the cache for connections A, B, C, and D. In seq. 4–6, additional packets for connections A, B, and C arrive, resulting in cache hits, since connection contexts for A, B, and C are resident in the cache. However, in seq. 8, connection E generates a packet, and a cache miss occurs. Since the cache entry associated with connection was the least recently used, it is selected for replacement. Accordingly, the contents of the cache after seq. 8 is E, B, C, and D. The next packet to arrive in seq. 9, however, is generated by connection A, resulting in another cache miss. Again, the least recently used entry is selected for replacement, i.e., the connection context for connection B. A similar case occurs in seq. 10 and 11, when packets arrive for connections B and C respectively. Thus, two more cache misses occur.

For the simplified example shown in Table II, arrival of 16 packets generated eight cache misses (shown by bolded underlined letters), signifying a cache miss rate of 50%. Disregarding the initial process of populating the cache which takes place in seq. 1–7, and focusing on the replacement pattern which results after the cache has been filled, cache misses occur in eight out of nine cases (seq. 8–16), i.e., a cache miss rate of about 89%.

Table III below presents a cache replacement pattern resulting from using the rate estimation algorithm, according to a preferred embodiment of the present invention:

TABLE III

| Seq. | Packet arrival | Priority cache contents after arrival | Utility cache contents after arrival | Cache miss? |
|------|----------------|----------------------------------------|---------------------------------------|-------------|
| 1    | A              | A B C                                  |                                       |             |
| 2    | B              | A B C                                  |                                       |             |
| 3    | C              | A B C                                  |                                       |             |
| 4    | A              | A B C                                  |                                       |             |
| 5    | B              | A B C                                  |                                       |             |
| 6    | C              | A B C                                  |                                       |             |
| 7    | D              | A B C                                  | D                                     |             |
| 8    | E              | A B C                                  | E                                     | YES         |
| 9    | A              | A B C                                  | E                                     |             |
| 10   | B              | A B C                                  | E                                     |             |
| 11   | C              | A B C                                  | E                                     |             |
| 12   | E              | A B C                                  | E                                     |             |

TABLE III-continued

| Seq. | Packet arrival | Priority cache contents after arrival | Utility cache contents after arrival | Cache miss? |
|---|---|---|---|---|
| 13 | D | A B C | <u>D</u> | YES |
| 14 | A | A B C | D | |
| 15 | B | A B C | D | |
| 16 | C | A B C | D | |

The system presented in Table III comprises two categories of internal cache memory: a three-entry priority cache, comprising contexts for fast connections, and a one-entry L1 cache, comprising contexts for slow connections. The two internal caches are managed using rate estimation, described in detail above.

Packets arrive in the same order as in the LRU example illustrated in Table II. Since connections A, B, and C are determined to be fast connections, their respective context information is loaded into priority cache. Thus, the initial contents of priority cache, as shown in seq. 1, is A, B, and C. Seq. 1–6 show cache hits, since the required context information for arriving packets is resident in priority cache. In seq. 7, a packet arrives on slow connection D. The connection context for D is loaded into L1 cache. At this point in time, both priority and L1 cache are full.

In seq. 8, a packet arrives on slow connection E, causing a cache miss. Connection E context information replaces connection D in L1 cache. Additional packets for fast connections A, B, and C arrive in seq. 9–11, resulting in cache hits, since A, B, and C are resident in priority cache. An additional packet for connection E arrives in seq. 12, also resulting in a cache hit. In seq. 13, another packet arrives for connection D. Its arrival causes a cache miss, resulting in replacing connection E's context information in L1 cache by connection D's context. Additional packets arrive for fast connections A, B, and C in seq. 14–16. Since A, B, and C remain classified as fast connections, their context information is resident in priority memory.

For the simplified example shown in Table III, arrival of 16 packets generated two cache misses, signifying a cache miss rate of 12%. Disregarding the initial process of populating the cache which takes place in seq. 1–7, and focusing on the replacement pattern which results after the cache has been filled, cache misses occur only in two out of nine cases (seq. 8–16), i.e., a cache miss rate of about 22%, as compared with 89% for LRU. Thus, rate estimation provides a significant performance improvement over LRU.

While the preferred embodiments described above relate to network applications, embodiments of the current invention may be applied equally to systems wherein multiple tasks handle streams of input or events, not necessarily generated by a communication network, e.g., multi-tasking systems with dynamic priorities responsive to computation results, or operating systems handling multiple interrupts from attached devices. Each task requires that its context information be resident in cache, in order to handle an item from its respective input stream.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Cache apparatus, comprising:

first and second cache memories, coupled to receive and hold context information from an external memory with respect to a plurality of tasks, each task being activated by one or more activating events, so that the context information is available for access by a processor in performing the tasks; and a mapper, which is coupled to receive a classification of the tasks as fast and slow tasks, and which is adapted, upon receipt of one of the activating events for one of the fast tasks to be performed by the processor, to cause the context information with respect thereto to be received in the first cache memory, and upon receipt of one of the activating events for one of the slow tasks to be performed by the processor, to cause the context information with respect thereto to be received in the second cache memory; and a rate estimator module, which is adapted to compute respective rates of the tasks performed by the processor, so that the tasks are classified as the fast and the slow tasks, wherein the rate estimator module comprises:

a rate estimator for each of the plurality of tasks, which is adapted to calculate a current-rate for a respective task, responsive to a previous-rate of the respective task, a first number of activating events received for the respective task, and a filter parameter; and an interface rate minimizer for the plurality of tasks, which is adapted to calculate the filter parameter, responsive to a second number of activating events received for the plurality of tasks and a number of accesses to the external memory.

2. Apparatus according to claim 1, wherein the rate estimator comprises:

an activating-event-counter for the respective task, which is adapted to count the first number of activating events received for the respective task during a time T of a rate-window; and a rate-calculator, which is adapted to set the current-rate substantially equal to $(1-\alpha)*LastRate+\alpha*Nc$, wherein $\alpha$ comprises the filter parameter, LastRate comprises the previous-rate, and Nc comprises the first number of activating events, for the respective task.

3. Apparatus according to claim 2, wherein the time T is determined in response to a model of expected behavior of the activating events.

4. Apparatus according to claim 2, wherein the time T comprises a value of the order of 1000 μs.

5. Apparatus according to claim 1, wherein the rate estimator comprises a first logic resident in the first cache memory, and a second logic resident in at least one of the external memory and the second cache memory.

6. Apparatus according to claim 1, wherein the rate estimator operates periodically, responsive to an elapse of time.

7. Apparatus according to claim 1, wherein the interface rate minimizer operates periodically, responsive to an elapse of time.

8. Apparatus according to claim 1, wherein the interface rate minimizer comprises:

an external-memory-access-counter, which is adapted to count the number of accesses to the external memory during a time T1 of a sliding-window;

an activating-event-counter for the plurality of tasks, which is adapted to count the second number of activating events received for the plurality during time T1; and a filter-parameter-calculator, which is adapted to set a value $\alpha^{n+1}$ for the sliding-window to be substantially equal to $$\frac{\alpha^n}{\exp\left((f(\alpha)^n - f(\alpha)^{n-1}) * \mathrm{Lim}\left(\frac{1}{\log\left(\frac{\alpha^n}{\alpha^{n-1}}\right)}\right)\right)}$$

wherein n+1, n, and n−1 are sliding-window time indices, $f(\alpha)^n$ is an adaptive filter cost function at time index n, $f(\alpha)^{n-1}$ is an adaptive filter cost function parameter at time index n+1, $\alpha^n$ is the value of the filter parameter at time index n, $\alpha^{n-1}$ is the value of the filter parameter at time index n−1, and Lim is a limiting function.

9. Apparatus according to claim 8, wherein the time T1 is substantially equal to a product of X and T, wherein T comprises a time for which the current-rate is calculated, and X comprises a value in a range between approximately $10^3$ and approximately $10^6$.

10. Apparatus according to claim 8, wherein the limiting function comprises a function $$\mathrm{Lim}(x) = \begin{cases} L & \text{for } x > L \\ x & \text{for } -L < x < -L \\ -L & \text{for } x < -L \end{cases}$$

wherein x is a real number and L is a limiting value.

11. Apparatus according to claim 10, wherein the limiting value L is set to be substantially equal to 10.

12. Apparatus according to claim 1, wherein the rate estimator module analyzes the activating events so as to generate a model of an expected behavior thereof.

13. Apparatus according to claim 12, wherein the model comprises a 4 Interrupted Poisson Process (4IPP) model of network traffic.

14. Apparatus according to claim 1, wherein the classification of the tasks is performed periodically, so as to provide for a reclassification of the tasks, responsive to changes in a rate of the receipt of the activating events over time.

15. Apparatus according to claim 1, wherein the tasks comprise processes in a network transceiver application having a plurality of connections, each connection having a connection context, and wherein the one or more activating events comprises one or more packets received and transmitted via the connections.

16. Apparatus according to claim 1, wherein the tasks comprise processes in a multi-tasking system, each task having a respective priority, the classification of the tasks being responsive to the priority and to a rate of the one or more activating events, and wherein the one or more activating events are chosen from a group comprising reading of data from an input stream, an interrupt, and computation logic.

17. Apparatus according to claim 1, wherein the first cache memory receives and holds substantially all the context information for the fast tasks.

18. Apparatus according to claim 1, wherein the second cache memory receives and holds the context information or the slow tasks.

19. Apparatus according to claim 1, wherein the processor comprises a plurality of processing engines.

20. Apparatus according to claim 1, wherein causing the context information to be received in the first cache memory comprises selecting a replacement-candidate context information, storing the replacement-candidate context information in the external memory, and loading the context information into the first cache memory.

21. Apparatus according to claim 1, wherein causing the context information to be received in the second cache memory comprises selecting a replacement-candidate context information, storing the replacement-candidate context information in the external memory, and loading the context information into the second cache memory.

22. Apparatus according to claim 1, wherein the tasks receive the one or more activating events at a rate varying over time.

23. Apparatus according to claim 1, wherein the one or more activating events for a first task in the plurality are generated substantially independently of the one or more activating events for a second task in the plurality.

24. Apparatus according to claim 1, wherein the first and second cache memories and the mapper are implemented in an integrated circuit chip.

25. Apparatus according to claim 1, wherein at least one of the first and second cache memories comprises an on-chip memory.

26. Apparatus according to claim 1, wherein the mapper is adapted to generate a set of replacement-candidates from among the context information in the first and second cache memories, responsive to the classification of the tasks.

27. Apparatus according to claim 1, and wherein the mapper is adapted to perform a synchronization between a handling of a first and a second activating event comprised in the one or more activating events for one of the tasks, the synchronization comprising:

causing the context information for the task to be received in the first and second cache memories upon receipt of the first activating event, the processor performing the task responsive to the first activating event for a time duration; and causing the context information for the task to be retained in the first and second cache memories upon receipt of the second activating event for the task within the time duration, so that the context information remains available to the processor in performing the task responsive to the second activating event.

28. Apparatus according to claim 27, wherein a first processor comprised in the processor performs the task responsive to the first activating event, and a second processor comprised in the processor performs the task responsive to the second activating event, the first and second processors accessing the context information received in the cache memories upon receipt of the first activating event.

29. A method for managing a cache memory comprising:

determining classifications of a plurality of tasks to be performed by a processor, the tasks having respective context information residing in an external memory, each task being activated by one or more activating events, according to rates of the tasks; partitioning the cache memory so as to allocate respective areas of the cache memory to the tasks according to the classifications; and upon receipt of the one or more activating events for one of the tasks to be performed by the processor, conveying the context information with respect thereto from the external memory to the respective areas of the cache memory, responsive to the classification, for use by the processor in performing the tasks, wherein determining the classifications comprises computing the rates of the tasks so that the tasks are classified as fast and slow tasks, and wherein partitioning the cache memory comprises partitioning the cache memory into first and second areas of the cache memory, and wherein computing the rates of the tasks comprises:

calculating a current-rate for a respective task, responsive to a previous-rate of the respective task, a first number of activating events received for the respective task, and a filter parameter; and computing the filter parameter, responsive to a second number of activating events received for the plurality of tasks and a number of accesses to the external memory.

30. A method according to claim 29, wherein calculating the current-rate comprises:

counting a number of activating events received for the respective task during a time T of a rate-window; and setting the current-rate substantially equal to $(1-\alpha)*$LastRate$+\alpha*$Nc, wherein $\alpha$ is the filter parameter, LastRate is the previous-rate, and Nc is the number of activating events, for the respective task.

31. A method according to claim 30, wherein the time T is determined in response to a model of expected behavior of the activating events.

32. A method according to claim 30, wherein the time T is substantially equal to a value of the order of 1000 μs.

33. A method according to claim 29, wherein calculating the current-rate for the task classified as the fast task comprises executing a first logic resident in the first cache memory, and wherein calculating the current-rate for the task classified as the slow task comprises executing a second logic resident in at least one of the external memory and the second cache memory.

34. A method according to claim 29, wherein calculating the current-rate is performed periodically, responsive to an elapse of time.

35. A method according to claim 29, wherein computing the filter parameter is performed periodically, responsive to an elapse of time.

36. A method according to claim 29, wherein computing the filter parameter comprises:

counting the number of accesses to the external memory during a time T1 of a sliding-window;

counting the second number of activating events received for the plurality of tasks during the time T1; and setting the filter parameter for the sliding-window for a time n+1 to be substantially equal to $$\frac{\alpha^n}{\exp\left((f(\alpha)^n - f(\alpha)^{n-1}) * \text{Lim}\left(\frac{1}{\log\left(\frac{\alpha^n}{\alpha^{n-1}}\right)}\right)\right)}$$

wherein n+1, n, and n−1 are sliding-window time indices, $f(\alpha)^n$ is an adaptive filter cost function at time index n, $f(\alpha)^{n-1}$ is an adaptive filter cost function at time index n−1, $\alpha^{n+1}$ is the value of the filter parameter at time index n+1, $\alpha^n$ is the value of the filter parameter at time index n, $\alpha^{n-1}$ is the value of the filter parameter at time index n−1, and Lim is a limiting function.

37. A method according to claim 36, wherein the time T1 is substantially equal to a product of X and T, wherein T comprises a time for which the current-rate is calculated, and X comprises a value in a range between approximately $10^3$ and approximately $10^6$.

38. A method according to claim 36, wherein the limiting function comprises a function $$\text{Lim}(x) = \begin{cases} L & \text{for } x > L \\ x & \text{for } -L < x < -L \\ -L & \text{for } x < -L \end{cases}$$

wherein x is a real number and L is a limiting value.

39. A method according to claim 38, wherein the limiting value L is set to be substantially equal to 10.

40. A method according to claim 29, wherein computing the rates of the tasks comprises analyzing the activating events, so as to generate a model of an expected behavior thereof.

41. A method according to claim 40, wherein the model comprises a 4 Interrupted Poisson Process (4IPP) model of network traffic.

42. A method according to claim 29, wherein determining the classifications is performed periodically, so as to provide for a reclassification of the tasks, responsive to changes in a rate of the receipt of the one or more activating events over time.

43. A method according to claim 29, wherein the tasks comprise processes in a network transceiver application having a plurality of connections, each connection having a connection context, and wherein the one or more activating events comprises one or more packets received and sent via the connections.

44. A method according to claim 29, wherein the tasks comprise processes in a multi-tasking system, each task having a respective priority, the classification of the tasks being responsive to the priority and to a rate of the one or more activating events, and wherein the one or more activating events are chosen from a group comprising reading of data from an input stream, an interrupt, and computation logic.

45. A method according to claim 29, wherein partitioning the cache memory comprises allocating a first cache area and a second cache area, and wherein determining the classifications comprises classifying a first task comprised in the tasks as a fast task and a second task comprised in the tasks as a slow task.

46. A method according to claim 45, wherein conveying the context information comprises conveying the context information for the fast task to the first cache area and conveying the context information for the slow task to the second cache area.

47. A method according to claim 46, wherein conveying the context information with respect to the fast task comprises selecting a replacement-candidate context information, storing the replacement-candidate context information in the external memory, and loading the context information with respect to the fast task into the first cache area.

48. A method according to claim 46, wherein conveying the context information with respect to the slow task comprises selecting a replacement-candidate context information, storing the replacement-candidate context information in the external memory, and loading the context information with respect to the slow task into the second cache area.

49. A method according to claim 29, wherein the processor comprises a plurality of processing engines.

50. A method according to claim 29, wherein the tasks receive the one or more activating events at a rate varying over time.

51. A method according to claim 29, wherein the one or more activating events for a first task in the plurality of tasks are generated substantially independently of the one or more activating events for a second task in the plurality of tasks.

52. A method according to claim 29, and comprising implementing determining classifications, partitioning the cache memory, and conveying the context information in a logic in an integrated circuit chip.

53. A method according to claim 29, wherein at least one of cache memory areas comprises an on-chip memory store.

54. A method according to claim 29, wherein conveying the context information comprises generating a set of replacement-candidates from among the context information in a first and second area of the cache memory comprised in the respective areas, responsive to the classifications of the tasks.

55. A method according to claim 29, and comprising performing a synchronization between a handling of a first and a second activating event comprised in the one or more activating events for one of the tasks, the synchronization comprising:

conveying the context information for the task to an area in the cache memory, upon receipt of the first activating event, the processor performing the task responsive to the first activating event for a time duration; and causing the context information to be retained in the area of the cache memory upon receipt of the second activating event for the task within the time duration, so that the context information remains available to the processor in performing the task responsive to the second activating event.

56. A method according to claim 55, wherein a first processor performs the task responsive to the first activating event, and a second processor performs the task responsive to the second activating event, the first and second processors accessing the context information received in the cache memory upon receipt of the first activating event.

* * * * *